(12) United States Patent
Roesler

(10) Patent No.: US 6,180,745 B1
(45) Date of Patent: Jan. 30, 2001

(54) MOISTURE-CURABLE COMPOSITIONS CONTAINING ISOCYANATE AND SUCCINYL UREA GROUPS

(75) Inventor: Richard R. Roesler, Wexford, PA (US)

(73) Assignee: Bayer Corporation, Pittsburgh, PA (US)

( * ) Notice: Under 35 U.S.C. 154(b), the term of this patent shall be extended for 0 days.

(21) Appl. No.: 09/436,328

(22) Filed: Nov. 8, 1999

(51) Int. Cl.$^7$ .................. C08G 18/32; C08G 18/34; C08G 18/73; C08G 18/75; C08L 75/02

(52) U.S. Cl. .................. 528/59; 252/182.2; 252/182.21; 528/49; 528/68; 528/73; 528/82; 528/84; 564/32; 564/58; 564/59; 564/60; 544/67; 544/222; 548/951; 548/952; 560/330; 560/355; 540/202

(58) Field of Search .................. 528/49, 59, 68, 528/82, 84, 73; 252/182.2, 182.21; 560/330, 355; 564/32, 58, 59, 60; 544/67, 222; 540/202; 548/951, 952

(56) References Cited

U.S. PATENT DOCUMENTS

| | | | |
|---|---|---|---|
| 3,420,800 | 1/1969 | Haggis | 528/59 |
| 3,549,599 * | 12/1970 | Merten | 528/73 |
| 3,567,692 | 3/1971 | Haggis et al. | 528/64 |
| 3,639,418 * | 2/1972 | Merten | 548/314.1 |
| 5,412,056 * | 5/1995 | Zwiener et al. | 528/73 |
| 5,591,807 * | 1/1997 | Cai et al. | 525/381 |
| 5,623,045 * | 4/1997 | Zwiener et al. | 528/68 |
| 5,756,751 * | 5/1998 | Schmalstieg et al. | 548/110 |
| 6,005,047 * | 12/1999 | Shaffer et al. | 524/590 |
| 6,013,755 * | 1/2000 | Primeaux, II et al. | 528/68 |

* cited by examiner

*Primary Examiner*—Rabon Sergent
(74) *Attorney, Agent, or Firm*—Joseph C. Gil; Thomas W. Roy

(57) ABSTRACT

The present invention relates to moisture-curable compositions which have a) a content of (cyclo)aliphatically-bound isocyanate groups (calculated as NCO, MW 42) of 0.2 to 22% by weight and b) a content of succinyl urea groups (calculated as —NH—CO—N—, MW 57) of 0.1 to 14% by weight, and c) an equivalent ratio of (cyclo)aliphatically-bound isocyanate groups to succinyl urea groups of 4:1 to 1:1, wherein the preceding percentages are based on resin solids content of the moisture-curable compositions.

The present invention also relates to coating, adhesive or sealing compositions containing these moisture-curable compounds as the binder.

19 Claims, No Drawings

MOISTURE-CURABLE COMPOSITIONS CONTAINING ISOCYANATE AND SUCCINYL UREA GROUPS

BACKGROUND OF THE INVENTION

1. Field of the Invention

The present invention relates to moisture-curable compositions containing (cyclo)aliphatically-bound isocyanate groups and succinyl urea groups, which can be cured in the presence of moisture to form coatings, adhesives and sealants.

2. Description of the Prior Art

It is known that polyisocyanate resins are curable in the presence of atmospheric moisture to form polyurea coatings. During the curing mechanism an isocyanate group reacts with moisture to form an amino group, which then reacts with another isocyanate group to form a urea group. One of the disadvantages of these moisture-curable resins is that the curing mechanism is relatively slow.

It has been suggested in U.S. Pat. Nos. 3,420,800 and 3,567,692 that the curing rate of moisture-curable polyisocyanates can be increased by incorporating either aldimines or ketimines. It is stated that the reaction of moisture with an aldimine or ketimine to form the corresponding amine is faster than the reaction of moisture with an isocyanate group to form an amine. A disadvantage of the use of aldimines and ketimines to accelerate the cure of polyisocyanates is that it requires the preparation of an additional component and requires some type of metering equipment to ensure that the two components are blended in the proper proportions.

It is an object of the present invention to increase the curing rate of moisture-curable polyisocyanates without the need for a co-reactant.

This object may be achieved with the compositions according to the present invention which contain isocyanate groups and succinyl urea groups as described hereinafter. The succinyl urea groups may be formed by the reaction of isocyanate groups with aspartate groups.

Copending applications, U.S. Ser. No. 09/172,751, now U.S. Pat. No. 6,005,047 and Ser. No. 09/172,584, disclose polyisocyanates that have been modified to contain alkoxysilane groups incorporated through amino or aspartate groups in order to improve the cure rate of the polyisocyanates. It is disclosed that the faster curing rates are surprising because alkoxysilane groups, which are also curable in the presence of moisture, cure more slowly than polyisocyanates. However, when both isocyanate groups and alkoxysilane groups are present, a faster curing rate is obtained.

SUMMARY OF THE INVENTION

The present invention relates to moisture-curable compositions which have
a) a content of (cyclo)aliphatically-bound isocyanate groups (calculated as NCO, MW 42) of 0.2 to 22% by weight and
b) a content of succinyl urea groups (calculated as —NH—CO—N—, MW 57) of 0.1 to 14% by weight, and
c) an equivalent ratio of (cyclo)aliphatically-bound isocyanate groups to succinyl urea groups of 4:1 to 1:1,
wherein the preceding percentages are based on resin solids content of the moisture-curable compositions.

The present invention also relates to coating, adhesive or sealing compositions containing these moisture-curable compounds as the binder.

DETAILED DESCRIPTION OF THE INVENTION

The moisture-curable compositions according to the present invention are based on the reaction products of polyisocyanates containing (cyclo)aliphatically-bound isocyanate groups and compounds containing aspartate groups. The succinyl urea groups are formed by the reaction of isocyanate groups with aspartate groups.

The moisture-curable compositions of the present invention have
a) a content of (cyclo)aliphatically-bound isocyanate groups (calculated as NCO, MW 42) of 0.2 to 22% by weight, preferably 2 to 20% by weight and more preferably 5 to 15% by weight,
b) a content of succinyl urea groups (calculated as —NH—CO—N—, MW 57) of 0.1 to 14% by weight, preferably 2 to 14% by weight and more preferably 3 to 10% by weight, and
c) an equivalent ratio of (cyclo)aliphatically-bound isocyanate groups to succinyl urea groups of 4:1 to 1:1, preferably 3:1 to 1:1 and more preferably 3:1 to 1.5:1,
wherein the preceding percentages are based on the weight of the moisture-curable compositions.

Suitable compounds containing aspartate groups, which may used to prepare the compounds containing succinyl urea groups, include those corresponding to formula I

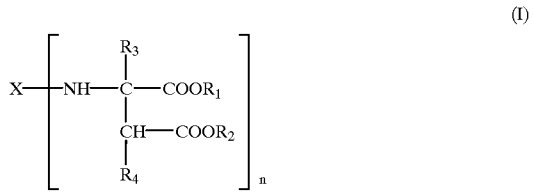

wherein
X represents an organic group which has a valency of n and is inert to isocyanate groups at a temperature below 100° C., preferably an n-valent hydrocarbon group obtained by removing the amino groups from an aliphatic, araliphatic, cycloaliphatic or aromatic monoamine or polyamine, more preferably a linear or branched aliphatic monoamine or polyamine and most preferably a linear or branched aliphatic monoamine, $R_1$ and $R_2$ are identical or different and represent organic groups which are inert to isocyanate groups at a temperature of 100° C. or less, preferably alkyl groups having 1 to 9 carbon atoms, more preferably methyl, ethyl or butyl groups, $R_3$ and $R_4$ are identical or different and represent hydrogen or organic groups which are inert to isocyanate groups at a temperature of 100° C. or less, preferably hydrogen and n has a value of at least 1, preferably 1 to 4 and more preferably 1.

With regard to preceding definitions $R_1$ and $R_2$ may be different when the polyaspartates are prepared from mixed maleates, such as methylethyl maleate. In addition, one $R_1$ may be different from another $R_1$. For example, when a mixture of maleates, e.g. dimethyl and diethyl maleate, is used to prepare a diaspartate, one pair of $R_1$ and $R_2$ groups will be methyl and the other will be ethyl.

The polyaspartates may be prepared in known manner as described in U.S. Pat. No. 5,126,170, herein incorporated by reference by reacting the corresponding primary monoamines or polyamines corresponding to the formula $$X—(—NH_2)_n \qquad \text{(II)}$$

with optionally substituted maleic or fumaric acid esters corresponding to the formula $$ROOC_1—CR_3=CR_4—COOR_2 \qquad \text{(III)}$$

Suitable monoamines include ethylamine, the isomeric propylamines, butylamines, pentylamines and hexylamines, and cyclohexylamine.

Suitable polyamines include ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane.

Examples of optionally substituted maleic or fumaric acid esters suitable for use in the preparation of the compounds corresponding to formula I include dimethyl, diethyl and di-n-butyl esters of maleic acid and fumaric acid, the previously discussed mixed maleates and fumarates, and the corresponding maleic or fumaric acid esters substituted by methyl in the 2- and/or 3-position. The dimethyl, diethyl and dibutyl esters of maleic acid are preferred and the diethyl and dibutyl esters are especially preferred.

Suitable polyisocyanates for preparing the compounds containing succinyl urea groups are selected from monomeric polyisocyanates, polyisocyanate adducts and NCO prepolymers, preferably monomeric polyisocyanate and polyisocyanate adducts and more preferably polyisocyanate adducts. The polyisocyanates contain (cyclo)aliphatically-bound isocyanate groups and have an average functionality of 1.5 to 6, preferably 1.8 to 6, more preferably 2 to 6 and most preferably 2 to 4.

Suitable monomeric diisocyanates may be represented by the formula $$R(NCO)_2$$

wherein R represents an organic group obtained by removing the aliphatically- and/or cycloaliphatically-bound isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms or a divalent araliphatic hydrocarbon group having 7 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane(isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate and mixtures thereof. Polyisocyanates containing 3 or more isocyanate groups, such as 4-isocyanantomethyl-1,8-octamethylene diisocyanate, may also be used.

Preferred organic diisocyanates include 1,6-hexamethylene diisocyanate, 1-isocyanato-3-isocyanatomethyl-3,5,5-trimethyl-cyclohexane(isophorone diisocyanate or IPDI), bis-(4-isocyclohexyl)-methane and 1-isocyanato-1-methyl-4(3)-isocyanatomethy cyclohexane.

In accordance with the present invention the polyisocyanate component is preferably in the form of a polyisocyanate adduct. Suitable polyisocyanate adducts are those containing isocyanurate, uretdione, biuret, urethane, allophanate, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906,126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, uretdione, biuret groups, iminooxadiazine dione and/or allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide and/or propylene oxide, which may be used in sequence or in admixture.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaldimines disclosed in U.S. Pat. No. 5,466,771, herein incorporated by reference.

These NCO prepolymers preferably have an isocyanate content of 0.3 to 35% by weight, more preferably 0.6 to 25% by weight and most preferably 1.2 to 20% by weight. The NCO prepolymers are produced by reacting the diisocyanates with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

The moisture-curable compositions according to the invention may be prepared by several different processes. In one process at least a portion, preferably all of the isocyanate groups, of the polyisocyanate component are reacted with a compound containing aspartate groups to form a compound containing succinyl urea groups and optionally unreacted isocyanate groups. These compounds are then blended with the previously described monomeric polyisocyanates, polyisocyanate adducts or NCO prepolymers to obtain compositions containing the required amount of succinyl urea groups. An advantage of this embodiment is that different polyisocyanate components can be used to prepare the compounds containing the succinyl urea groups and for the moisture-curable portion of the composition.

In accordance with another embodiment of the present invention a portion of the isocyanate groups of the polyisocyanate component are reacted with the compounds containing aspartate groups such that the resulting reaction products contain the required amount of succinyl urea groups and unreacted isocyanate groups. No further addition of a polyisocyanate component is necessary with this embodiment.

The reaction to form the succinyl urea groups is conducted at a temperature of 10 to 100° C., preferably 20 to 80° C. and more preferably 20 to 50° C.

The compounds of the present invention are suitable for use in one-component coating, adhesive or sealing compositions, which can be cured in the presence of atmospheric moisture. The compositions cure by the reaction of isocyanate groups with moisture.

The one-component compositions generally may be either solvent-free or contain up to 70%, preferably up to 60% organic solvents, on the weight of the one-component composition, depending upon the particular application. Suitable organic solvents include those which are known from polyurethane chemistry.

The compositions may also contain known additives, such as catalysts, leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

The one-component compositions may be cured at ambient temperature or at elevated temperatures. Preferably, the moisture-curable resins are cured at ambient temperatures.

The invention is further illustrated but is not intended to be limited by the following examples in which all parts and percentages are by weight unless otherwise specified.

EXAMPLES

Polyisocyanate Resin 1 (Comparison)

An isocyanurate group-containing polyisocyanate prepared from 1,6-hexamethylene diisocyanate and having an isocyanate content of 21.6%, a content of monomeric diisocyanate of <0.2% and a viscosity at 25° C. of 3000 mPa.s (available from Bayer Corporation as Desmodur N 3300).

Polyisocyanate Resin 2

An polyisocyanate which contains allophanate groups and isocyanurate groups, is prepared from 1,6-hexamethylene diisocyanate and has an isocyanate content of 20.3%, a content of monomeric diisocyanate of <0.2% and a viscosity at 25° C. of about 1100 mPa≈s (available from Bayer Corporation as Desmodur XP-7100).

Polyisocyanate 3

A polyisocyanate which contains allophanate groups, is prepared from 4,4'-diphenylmethane diisocyanate and has an isocyanate content of 26% and a viscosity at 25° C. of about 100 mPa≈s (available from Bayer Corporation as Mondur MA 2600).

Preparation of Aspartic Ester 1—N-butyl Aspartic Acid Diethyl Ester 146.8 parts (2.0 equiv.) of n-butyl amine were added to a round bottom flask fitted with stirrer, nitrogen inlet, addition funnel and cooling bath. 344 parts (2.0 equiv.) of diethyl maleate were added dropwise over a period of 4 hours and at a rate such that the reaction was maintained below 30° C. during the addition. The reactor was stirred for an additional 3½ at which time the product was poured into a glass container. After one week the Michael Addition reaction was 98.3% complete. The product had a viscosity of 6 mPa.s at 25° C.

Preparation of Succinyl Urea 1

97.5 parts (0.5 equiv.) of polyisocyanate 1 and 55 parts of n-butyl acetate were added to a round bottom flask fitted with stirrer, nitrogen inlet, addition funnel and cooling bath. 122.6 parts (0.5 equiv.) of aspartic ester 1 were added to the flask via the addition funnel over a period of 1 hour. An exotherm was observed as the temperature increased from room temperature to 40° C. over the course of the addition. The reaction mixture was allowed to stand in the flask overnight and was then poured into a container. The resin solution had a viscosity of 3950 mPa.s at 25° C.

Preparation of Films From Succinyl Urea 1

Coating compositions were prepared by mixing polyisocyanate 1 with succinyl urea 1 and the catalysts and solvents set forth in the following table. The compositions, which had solids contents of 80%, were applied to glass plates with a 3 mil draw down bar and cured at 20° C. and 55% relative humidity. The compositions are set forth in Table 1 below.

The amounts of succinyl urea 1 are the amounts of solids added. The amount actually added is 25% higher since succinyl urea 1 is present at 80% solids.

The dry times, pendulum hardnesses and MEK double rubs are also set forth in the following table. Dry times were determined with a Gardner Dry Time Meter as described in the Pacific Scientific Instruction Manuals DG-9600 and DG-9300. Pendulum hardnesses were determined in accordance with ASTM D-4366-87 (Koenig Pendulum Hardness). The MEK double rub test used a two pound ball peen hammer, which had cheese cloth wrapped around the round end. The test was conducted by wetting the cloth with MEK and then rubbing the panel. One double rub consisted of one back and forth movement of the panel.

TABLE 1

| Formulation | A | B | C | D | E |
|---|---|---|---|---|---|
| Polyisocyanate 1 | 20.0 | 15.0 | 10.0 | 5.0 | 0 |
| Succinyl urea 1 | 0 | 6.0 | 10.0 | 14.0 | 16.0 |
| Triethylene diamine | 0.1 | 0.1 | 0.1 | 0.1 | 0.1 |
| Dibutyltin Acetoacetonate | 0.1 | 0.1 | 0.1 | 0.1 | 0.1 |
| n-Butyl Acetate | 2.2 | 2.2 | 2.2 | 2.2 | 2.2 |
| Dry Times, min. | | | | | |
| Set to Touch | >720 | >720 | 30 | 75 | Tacky |
| Surface Dry | — | — | 180 | 720 | Tacky |
| Hard Dry | — | — | >720 | 630 | Tacky |
| Pendulum Hardness, min. | | | | | |
| 1 Day | 27 | 20 | 14 | Tacky | Tacky |
| 2 Day | 87 | 75 | 23 | 3 | Tacky |
| 14 Day | 220 | 100 | 31 | 4 | Tacky |
| MEK Double Rubs after 15 Days, to loss of gloss | >100 | >100 | >100 | 1 | 1 |

Preparation of Succinyl Urea 2

97.5 parts (0.5 equiv.) of polyisocyanate 1 and 220 parts of n-butyl acetate were added to a round bottom flask fitted with stirrer, nitrogen inlet, addition funnel and cooling bath. 122.6 parts (0.5 equiv.) of aspartic ester 1 were added to the flask via the addition funnel over a period of 1 hour. An exotherm was observed as the temperature increased from room temperature to 40° C. over the course of the addition. The reaction mixture was allowed to stand in the flask overnight and was then poured into a container. The resin solution had a viscosity of 28 mPa.s at 25° C.

Preparation of Succinyl Urea 3 Containing Hydantoin Groups 100 parts of succinyl urea 2 were mixed with 0.5 parts of glacial acetic acid. the reaction solution was heated to 110° C. and subjected to vacuum distillation at 1 Torr to remove butyl acetate and generated ethanol. When the volatile components were completely removed, the reaction mixture was cooled to 40° C. and 210 parts of butyl acetate were added to obtain a 50% solids solution with a viscosity of 214 mPa.s at 25° C.

Preparation of Succinyl Urea 4

The preparation of succinyl urea 2 was repeated with the exception that 102.5 parts of Polyisocyanate 2 were used in place of Polyisocyanate 1. The amount of butyl acetate was increased to 225 parts to provide a 50% solids solution. The viscosity of the resin solution was 26 mPa.s at 25° C.

Preparation of Succinyl Urea 5

The preparation of succinyl urea 2 was repeated with the exception that 81.4 parts of Polyisocyanate 3 were used in place of Polyisocyanate 1. The amount of butyl acetate was decreased to 203.9 parts to provide a 50% solids solution. The viscosity of the resin solution was 24 mPa.s at 25° C.

Preparation of Succinyl Urea 6

The preparation of succinyl urea 2 was repeated with the exception that 9.9 parts of n-butyl isocyanate (0.1 equiv) were used in place of Polyisocyanate 1 and 12.9 parts of di-n-butyl amine were used in place of aspartic ester 1. The amount of butyl acetate was decreased to 22 parts to provide a 50% solids solution. The viscosity of the resin solution was 5 mPa.s at 25° C.

Preparation of Films From Polyisocyanate 1 and Succinyl Ureas 2–6

Coating compositions were prepared by mixing polyisocyanate 1 with the succinyl urea, catalyst and solvent using the following formulation:

|  | Weight | Weight solids |
|---|---|---|
| Polyisocyanate 1 | 10.0 | 10.0 |
| Succinyl urea | 20.0 | 10.0 |
| Dibutyltin Acetoacetonate | 0.1 | 0.1 |
| Triethylene diamine | 0.1 | 0.1 |

When Polyisocyanate 1 was not blended with a succinyl urea, an additional amount of n-butyl acetate was added to keep the solids of all of the solutions constant.

The compositions were applied to glass plates with a 5 mil draw down bar and cured at 24° C. and 55% relative humidity. The succinyl ureas, dry times and MEK double rubs are set forth in the following tables. The properties were determined as previously described.

TABLE 2

| Succinyl Urea | Dry time, minutes | | | MEK double rubs | |
|---|---|---|---|---|---|
|  | set to touch | surface dry | hard dry | 14 days | 23 days |
| None (Comp) | 120 | 390 | 600 | 100 | 100 |
| 2 | 60 | 240 | 360 | 60 | 80 |
| 3 (Comp) | 60 | 180 | 450 | 5 | 3 |
| 4 | 60 | 300 | 540 | 50 | 40 |
| 5 (Comp) | 90 | 300 | 480 | 20 | 20 |
| 6 (Comp) | >1440 | >1440 | >1440 | wet | 1 |

Preparation of Succinyl Urea 7

The preparation of succinyl urea 2 was repeated with the exception that 9.9 parts (0.1 equiv) of n-butyl isocyanate were used in place of Polyisocyanate 1, the amount of aspartic ester 1 was reduced to 24.5 parts (0.1 equiv.) and the amount of butyl acetate was decreased to 34.5 parts to provide a 50% solids solution. The viscosity of the resin solution was 4 mPa.s at 25° C.

Preparation of Succinyl Urea 8

The preparation of succinyl urea 2 was repeated with the exception that 11.1 parts (0.1 equiv.) of isophorone diisocyanate were used in place of Polyisocyanate 1, the amount of aspartic ester 1 was reduced to 24.5 parts (0.1 equiv.) and the amount of butyl acetate was decreased to 35.6 parts to provide a 50% solids solution. The viscosity of the resin solution was 11 mPa.s at 25° C.

Preparation of Films From Polyisocyanate 1 and Succinyl Ureas 7–8

Coating compositions were prepared by mixing polyisocyanate 1 with the succinyl urea, catalyst and solvent using the following formulation:

|  | Weight | Weight solids |
|---|---|---|
| Polyisocyanate 1 | 10.0 | 10.0 |
| Succinyl urea | 20.0 | 10.0 |
| Dibutyltin Acetoacetonate | 0.1 | 0.1 |
| Triethylene diamine | 0.1 | 0.1 |

When Polyisocyanate 1 was not blended with a succinyl urea, an additional amount of n-butyl acetate was added to keep the solids of all of the solutions constant.

The compositions were applied to glass plates with a 5 mil draw down bar and cured at 22° C. and 55% relative humidity. The succinyl ureas, dry times and MEK double rubs are set forth in the following tables. The properties were determined as previously described.

| Succinyl Urea Resin | Dry time, minutes | | | MEK Double Rubs after 16 days |
|---|---|---|---|---|
|  | Set to Touch | Surface dry | Hard dry |  |
| None | 180 | 300 | 420 | 100 |
| 7 (Comp) | 240 | 360 | >1490 | 5 |
| 8 | 120 | 300 | 480 | 40 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-curable composition which has
   a) a content of (cyclo)aliphatically-bound isocyanate groups (calculated as NCO, MW 42) of 0.2 to 22% by weight and
   b) a content of succinyl urea groups (calculated as —NH—CO—N—, MW 57) of 0.1 to 14% by weight, in which the succinyl urea groups are incorporated as the reaction product of a polyisocyanate with an amino compound corresponding to formula (I)

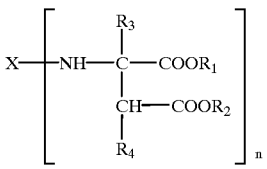

(I)

wherein

X represents an n-valent hydrocarbon group obtained by removing the amino groups from an aliphatic, araliphatic, cycloaliphatic or aromatic monoamine or polyamine, $R_1$ and $R_2$ are identical or different and represent organic groups which are inert to isocyanate groups at a temperature of 100° C. or less, $R_3$ and $R_4$ are identical or different and represent hydrogen or organic groups which are inert to isocyanate groups at a temperature of 100° C. or less and n has a value of at least 1, and c) an equivalent ratio of (cyclo)aliphatically-bound isocyanate groups to succinyl urea groups of 4:1 to 1:1, wherein the preceding percentages are based on the solids content of the moisture-curable compositions.

2. The composition of claim 1 wherein
   $R_1$ and $R_2$ are identical or different and represent alkyl groups having 1 to 9 carbon atoms,
   $R_3$ and $R_4$ represent hydrogen and
   n has a value of 1 to 4.

3. The composition of claim 1 wherein
   X represents an n-valent hydrocarbon group obtained by removing the amino group from an aliphatic monoamine,
   $R_1$ and $R_2$ are identical or different and represent methyl, ethyl or butyl,
   $R_3$ and $R_4$ represent hydrogen and
   n has a value of 1.

4. The composition of claim 1 wherein the polyisocyanate comprises a polyisocyanate adduct containing isocyanurate groups, biuret groups, allophanate groups, iminooxadiazine dione groups and/or uretdione groups.

5. The composition of claim 2 wherein the polyisocyanate comprises a polyisocyanate adduct containing isocyanurate groups, biuret groups, allophanate groups, iminooxadiazine dione groups and/or uretdione groups.

6. The composition of claim 3 wherein the polyisocyanate comprises a polyisocyanate adduct containing isocyanurate groups, biuret groups, allophanate groups, iminooxadiazine dione groups and/or uretdione groups.

7. The moisture-curable composition of claim 1 which has
   a) a content of (cyclo)aliphatically-bound isocyanate groups (calculated as NCO, MW 42) of 2 to 20% by weight,
   b) a content of succinyl urea groups (calculated as —NH—CO—N—, MW 57) of 2 to 14% by weight and
   c) an equivalent ratio of (cyclo)aliphatically-bound isocyanate groups to succinyl urea groups of 3:1 to 1:1, wherein the preceding percentages are based on the resin solids content of the moisture-curable compositions.

8. The composition of claim 7 wherein
   $R_1$ and $R_2$ are identical or different and represent alkyl groups having 1 to 9 carbon atoms,
   $R_3$ and $R_4$ represent hydrogen and
   n has a value of 1 to 4.

9. The composition of claim 7 wherein
   X represents an n-valent hydrocarbon group obtained by removing the amino group from an aliphatic monoamine,
   $R_1$ and $R_2$ are identical or different and represent methyl, ethyl or butyl,
   $R_3$ and $R_4$ represent hydrogen and
   n has a value of 1.

10. The composition of claim 7 wherein the polyisocyanate comprises a polyisocyanate adduct containing isocyanurate groups, biuret groups, allophanate groups, iminooxadiazine dione groups and/or uretdione groups.

11. The composition of claim 8 wherein the polyisocyanate comprises a polyisocyanate adduct containing isocyanurate groups, biuret groups, allophanate groups, iminooxadiazine dione groups and/or uretdione groups.

12. The composition of claim 9 wherein the polyisocyanate comprises a polyisocyanate adduct containing isocyanurate groups, biuret groups, allophanate groups, iminooxadiazine dione groups and/or uretdione groups.

13. The moisture-curable composition of claim 1 which has
   a) a content of (cyclo)aliphatically-bound isocyanate groups (calculated as NCO, MW 42) of 5 to 15% by weight,
   b) a content of succinyl urea groups (calculated as —NH—CO—N—, MW 57) of 3 to 10% by weight and
   c) an equivalent ratio of (cyclo)aliphatically-bound isocyanate groups to succinyl urea groups of 3:1 to 1.5:1, wherein the preceding percentages are based on the resin solids content of the moisture-curable compositions.

14. The composition of claim 13 wherein
   $R_1$ and $R_2$ are identical or different and represent alkyl groups having 1 to 9 carbon atoms,
   $R_3$ and $R_4$ represent hydrogen and
   n has a value of 1 to 4.

15. The composition of claim 13 wherein
   X represents an n-valent hydrocarbon group obtained by removing the amino group from an aliphatic monoamine,
   $R_1$ and $R_2$ are identical or different and represent methyl, ethyl or butyl,
   $R_3$ and $R_4$ represent hydrogen and
   n has a value of 1.

16. The composition of claim 13 wherein the polyisocyanate comprises a polyisocyanate adduct containing isocyanurate groups, biuret groups, allophanate groups, iminooxadiazine dione groups and/or uretdione groups.

17. The composition of claim 14 wherein the polyisocyanate comprises a polyisocyanate adduct containing isocyanurate groups, biuret groups, allophanate groups, iminooxadiazine dione groups and/or uretdione groups.

18. The composition of claim 15 wherein the polyisocyanate comprises a polyisocyanate adduct containing isocyanurate groups, biuret groups, allophanate groups, iminooxadiazine dione groups and/or uretdione groups.

19. A one-component coating, adhesive or sealant composition containing a binder wherein the binder comprises the moisture-curable compound of claim 1.

* * * * *